Patented May 12, 1942

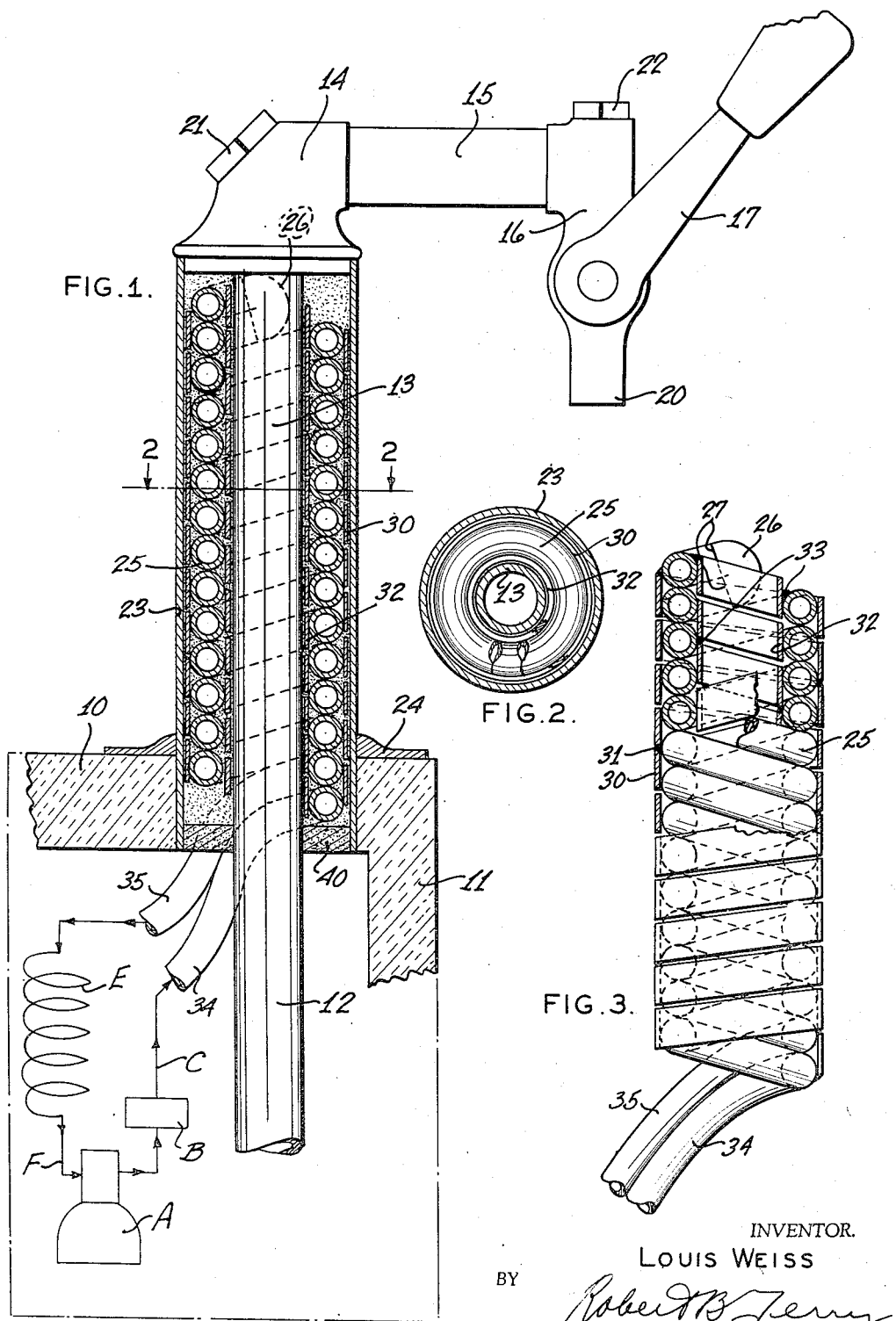

2,282,627

UNITED STATES PATENT OFFICE 2,282,627

DRAFT ASSEMBLY FOR CHILLED BEVERAGES

Louis Weiss, St. Louis, Mo.

Application January 6, 1941, Serial No. 373,251

10 Claims. (Cl. 62—141)

This invention relates to improvements in draft assemblies for chilled beverages, and more particularly to an improved construction of the draft tube for cooled potable liquids such as employed in connection with draft beer coolers, fountains and other equipment designed for the dispensing of beverages to the consumer.

The problem of providing for the instant chilling of draft beverages has heretofore been attended by considerable difficulty, due to the fact that the outer portion of the draft line, near the tap, is subject to room temperature. This fact results in a warm liquid being dispensed, particularly under conditions of only occasional use of the draft tap. This condition may and often does exist during periods of relatively infrequent patronage. It is accordingly a major object of the invention to provide a draft line cooling assembly of such nature that, even after a protracted period of inactivity, the beverage drawn will be chilled to any desired degree, down to and including freezing temperature if so desired.

Yet another object of the invention is attained in a refrigerated beverage faucet of such nature as to insure uniform temperature of the beverage between the barrel or supply thereof, and the glass, thereby avoiding fluctuations in taste and extent of chill which otherwise are bound to result from inequalities of temperature in the draft line as a whole.

Still further objects of the invention are attained in a low cost device of the type noted, which is rugged, durable and compact in nature, which may be easily dismantled and reassembled as for service or cleaning, which occupies practically no otherwise useful space exteriorly of a beer dispensing cabinet for example, and no space of consequence within the cabinet.

A still further object of the invention is attained in improved provisions for conducting a cooling fluid to and from a refrigerated zone of the draft line, in a manner requiring a minimum of additional space, and in a way to refrigerate a zone of the draft line which is proximate to the draft tap proper.

Yet an additional object of the invention is attained in a structure of the type and for the purpose noted, such that any and all of the tubing and other elements of the assembly may be disassembled without destruction or permanent damage to any of the parts thereof, thus making for quicker and less expensive service and maintenance at the very wide intervals in which any such attention may be required.

An additional and important object of the invention is attained in a provision for providing a visible frosting surface exteriorly of the refrigerated zone of the draft tube, which frosted surface has proven attractive to the trade, and indicative of the availability of the beverage at optimum drinking temperature.

The foregoing and numerous other objects will appear from the following more detailed description of a preferred embodiment of the assembly, particularly when considered in connection with the accompanying drawing, in which:

Fig. 1 is a vertical side elevation of a refrigerated draft tap assembly, the refrigerated zone of which is shown in section for clearness, and which is shown as attached to a portion of a cooling cabinet or the like. This figure illustrates diagrammatically, in addition to its structure, a schematic flow circuit for the cooling medium; Fig. 2 is a horizontal sectional view as taken along line 2—2 of Fig. 1, and Fig. 3 is a fragmentary, partly sectional view showing further details of the tubing, and assembly thereof in a cooling unit used for the circulation of a cooling medium about the draft tube.

Referring now by characters of reference to the drawing, the assembly of the present invention is shown as carried by and assembled to a draft cabinet, for example, one such as ordinarily provides the enclosing portion of a draft beer cooler. The top closure portion of the cabinet adjacent to the draft assembly is indicated generally at 10, and a vertical forward wall portion just rearwardly of the draft shelf, is indicated at 11.

As is well known in the art, it is customary to effect a connection from a suitable source of the potable beverage to be dispensed, thence to direct the draft line from such source, through a series of cooling coils chilled by ice or by mechanical refrigeration. For brevity and in keeping with prevailing practice, the latter method is preferred in the present disclosure. After leaving the cooling coils in the cabinet, the draft line is extended upwardly or outwardly of the cabinet and the outer portion of the draft line is indicated at 12. This is extended upwardly in the present example, into a liquid chilling portion 13, beyond which the draft line or draft tube extends through a suitable right angle fitting indicated generally at 14, thence into a horizontal section 15 directed to the tap proper 16 provided with the usual valve (not shown) and a valve operating handle 17. The delivery spout or nozzle of the draft assembly is indicated at 20.

For purposes of providing for ease of access to the interior of the vertical or riser portion 12—13 of the draft tube, as for cleaning, there is provided a removable threaded cap or plug member 21 so disposed that, upon removal of this closure, access may be had with a long cleaning brush or other tool, to both the vertical and horizontal legs of the outer end of the draft line. Similar means of access is indicated by the removable head or cap 22.

Referring now more in detail to the improvements characterizing the cooling agencies of present invention, the draft line cooling expedients include a casing 23 preferably but not necessarily of cylindrical form, but in any case of tubular aspect and of substantially greater cross sectional area than that of the draft tube section 13. From this it results that there is an appreciable spacing between the outer wall of tube 13 and the inner wall of casing 23. The casing 23 may be suitably supported as by a flange or like mounting 24 carried, for example, by the outer horizontal portion of the top closure 10 of the cabinet.

Provision for the circulation of a refrigerating or cooling medium include, in the example disclosed, a spirally wound, thin wall flexible tubing, preferably of a metal having high thermal conductive properties, such as copper. An understanding of structure of the tubing is thought best to be obtained by a brief reference to the manner of forming up the coil of the copper tubing. Before introducing the turns or convolutions, a doubled length of the tubing, the latter being indicated generally at 25, is provided at one end with a U-shaped fitting. By preference this is a separate element, as indicated at 26, and may be secured to the paired lengths of tubing as by sweating or soldering in the zones 27. Whether a separate fitting 26 be utilized, or whether a bight portion be formed up of the tubing itself in the zone 26, a suitable winding jig is employed so that the paired tubing elements are given a spiral form from either end to the other. The outer diameter of the resulting spiral structure is still preferably somewhat less than that of the inner diameter of casing 23, and the inner diameter of the spiral structure is yet slightly in excess of the outer diameter of the chilled section 13 of the draft tube, both for a reason hereinafter better appearing. It will be noted that the spiral tubing is formed into a hollow body, the length of which substantially equals that of the casing section 13, and hence serves to define the zone of effective direct chilling of the draft line, being section 13 thereof. For reasons of service, as well as for ease of installation in original assembly, it is desirable to assure within reasonable limits, nearly uniform outer and inner diameters of the unit of spirally formed tubing, throughout the length of the formed body thereof. It has been found conducive to best results, after a number of experiments, to provide for this characteristic through an outer spiral serving of flexible strip material of a reasonably conductive metal, copper having been found suitable. This outer serving of flat material is also spiral in contour and the turns of copper strip are indicated at 30, being the outermost elements appearing in the assembly of Fig. 3. To retain the copper ribbon or strip in a wound and slightly tensioned relation to the tubing, the strip is spot-soldered in certain zones where the edges of the strip lie close to the adjacent outer walls of the tubing 25, some of these soldering zones being indicated at 31 (Fig. 3).

It is a further preference to provide for a relatively smooth straight and uniform inner bore of the refrigerating coil unit about the draft tube section 13, by a spirally wound strip or ribbon of copper for example, as indicated at 32. At intervals also, the inner strip 32 is spot-soldered, as at 33, in order to fix the position of the wound core portion 32 to the inner walls of the tubing 25. When the unit is fabricated to the stage just described, the cooling unit possesses both an even internal and uniform external diameter, such that it may be easily inserted into and withdrawn from the lower end of the cylindrical casing 23. A sufficient length of tubing 25 is employed so as to result in the paired free ends of tubing within the cabinet extending below the lower end of the casing 23 and indicated respectively at 34 denoting the inlet or supply end of the unit, and 35 indicating the delivery or discharge end thereof. It is a further preference, in practice, that the draft line cooling units as described, when employed with the usual compressor-condenser-evaporator system of refrigeration, be connected in series with the usual evaporator within the cabinet proper, and ahead of such evaporator in the high pressure side of the system. This relation is indicated by the schematic flow diagram constituting the part of Fig. 1, and wherein the compressor is indicated at A, a condenser-receiver structure at B, and the delivery line therefrom designated at C, directed into the inlet portion 34 of the draft line cooling coil. The usual evaporator is diagrammatically indicated at E, with its return F to the suction side of compressor A. Controls, fittings, etc. are omitted in the interest of clarity, since they of themselves, form no part of the invention.

In assembly of the parts of the refrigerated draft tap, prior to completing the connections to lines 34 and 35, and prior to connection of the draft line portion 12 to its source (not shown), the casing 23 and immediately connected parts may be inverted, the formed coil unit shown by Fig. 3 inserted over the tube 12 so that it surrounds the section 13 of the draft line. At this point in assembly, it is an important feature to provide in the casing 23 a material which serves the primary purpose of improving the heat exchange effect between the draft line portion 13 and its liquid content, the coil unit including tubing 25, and the outer casing 23. This result is preferably accomplished by forcing, as with a suitable gun or the like under air pressure, a permanently plastic material possessing high thermal conductive properties. After exhaustive experiments there has been obtained a product sold to the trade as metallic Permagum. Permagum has been found admirably adapted for the purpose noted, and to possess the qualities desired. There is preferably employed a special gun grade of the Permagum which possesses a somewhat thinner consistency than some other grades utilized for other purposes. This product is produced by and available from the Presstite Engineering Company of St. Louis, Missouri. The material preferably utilized as a filler for casing 23 when forced into place, occupies all or substantially all of the voids otherwise existing between and about the elements of tubing 25 and the copper strip elements 30 and 32. The preferred material noted consists essentially of finely powdered metallic aluminum thoroughly mixed in a matrix of a bitumastic material such as asphaltum. The mix is preferably such that the metallic aluminum preponderates in proportion, in fact to such an extent that the conductive filler employed possesses the characteristic metallic luster due to its high metal content.

While any suitable closure means may be employed at the lower end of casing 23 for the physical retention of the tubing unit and the conductive filler in position in and about the draft tube section therein, it is preferred, for reasons of low cost and to facilitate ease of disassembly and reassembly, to employ a plug or closure portion 40 which may be poured into place and will set or harden sufficiently so as suitably to seal off the lower end of casing 23. Any of a number of low melting plastic materials may be employed for this purpose, but the plug 40 is preferably formed of a bitumastic material or composition.

With the assembly of casing 23 completed as described, connections may be made from the draft line 12 to its source of supply, and internally of the cabinet, to the lead-in and lead-out lines 34 and 35 for suitable connection into the refrigerating system as above noted.

In practice it has been found that the conductive plastic filler within the casing 23 not only coats but surrounds, when properly applied, the draft line portion 13, the spiral copper strip portions 32 and 30, and serves to make a good sealing contact with and to provide an improved degree of thermal conductivity between all of the metallic parts of the assembly identified with and lying along the portion 13 of the draft tube.

In usage, the conductivity of heat in a direction into the refrigerating tubing serves to chill not only the draft tube, but as before mentioned, serves to chill the casing 23 and under most conditions to provide an attractive, very thin coating of frost on the outer surface of casing 23. By great preference, so as to minimize the actual thickness of frost accumulation on element 23, the latter is preferably highly polished—preferably plated, as by usual chromium plating methods, for example.

It will have appeared that, as evidenced by a period of successful use and sales, the structure herein briefly described by way of example of embodiment of the invention, serves fully to attain each and all of the objects specifically set forth, as well as others implied by the more detailed description.

Although the invention has been described by making a more or less specific reference to a single preferred embodiment, the details of description are to be understood solely in an instructive and not in a limiting sense, since many changes may be made in the several parts of the assembly and in their arrangement, without departing from the full intended scope of the invention as expressed by the claims hereunto appended.

I claim as my invention:

1. In a draft tap assembly, a draft tap, a draft tube leading to the tap, a casing about a portion of the draft tube near the tap, a refrigerant tube within the casing adjacent to the draft tube, and a filling material, of a permanently plastic nature and containing a major proportion of particles of a metal of high thermal conductivity, said material substantially filling the space within the casing between and around the draft and cooling tubes, and between said tubes and the wall of the casing.

2. In a draft tap assembly, a draft tap, a draft tube leading to the tap, a casing about a length of the draft tube, a refrigerant tube within the casing adjacent the draft tube, a filling material of a permanently plastic nature and high thermal conductivity, substantially filling the space within the casing between and around the draft and cooling tubes, and between said tubes and the wall of the casing, and a layer of a plastic sealing material near one end of the casing, of such physical characteristics as to retain said filling material and cooling tube within the casing, the inlet and outlet ends of the cooling tube projecting through said layer of sealing material and being positioned thereby.

3. In a draft tap assembly, a draft tap, a draft tube leading to the tap, a vertical cylindrical casing, spacedly surrounding a portion of the draft tube near the tap, a tube for the circulation of a cooling medium, spirally wrapped about the draft tube within the casing, and having its inlet and outlet ends extended from the lower end of the casing, and a closure cap for the lower end of the casing, for removably supporting the cooling tube in position within the casing, said closure being of a thermoplastic material, adapted to be softened for removal, under a moderately high temperature.

4. The combination and arrangement of elements substantially as recited by claim 1, further characterized in that the filling material within the casing, consists in major proportion, of particles of metallic aluminum together with a permanently plastic matrix, and in which said filling material substantially completely occupies all of the voids existing within the cooled zone of the casing, about the draft tube and cooling tube.

5. In a draft tap assembly, a draft tap, a draft tube directed to the tap, a vertical, substantially cylindrical casing coaxially surrounding a portion of the draft tube in the vicinity of the tap, a tube for circulation of a cooling medium within the casing, and extended to a point beyond the casing for inlet and outlet connections for circulation of a cooling medium, a filling material of a permanently plastic nature and high thermal conductivity, which, together with the tube portions in the casing substantially fills the space within the cooled zone thereof, the body of filling material within the casing being arranged so as to augment heat transfer from the cooling tube to the draft tube, and from the cooling tube to the outside wall of the casing, and a readily removable support for the cooling tube and filling material, engaging one end of the casing, the cooling tube and filling material being free of securement to the casing except for the support.

6. A draft tap assembly for cooled beverages or the like, including a draft tap, a beverage tube leading to the tap, an elongate housing surrounding, in spaced relation, a portion of the beverage tube in the vicinity of the tap, a tubing of flexible material wrapped about a portion of the draft tube within the casing for the circulation of a cooling medium, means for supplying the cooling medium to the tube therefor, and a filling material removably occupying the cooled space within the housing about the tubing elements therein, the body of material consisting essentially of metallic particles of high thermal conductivity, in a bitumastic matrix.

7. A cooling unit for chilling a short rectilinear section of pipe to contain a beverage, said cooling unit comprising a doubled length of flexible tubing consisting of paired inlet and outlet portions of said tube spirally arranged about an axis substantially coincident with that of the length of pipe to be cooled, said unit having its supply and discharge ends at the same end of the spiral portion of the unit, and metal elements secured to several convolutions of the tubing, but free of securement to the pipe, for maintaining the convolutions of the unit in fixed relation to each other to preserve the shape of the unit independently of the pipe.

8. The cooling unit substantially as described in claim 7, further characterized in that the means for maintaining the shape of the spirally wound structure, consists of a spirally wrapped strip element secured to successive convolutions of the unit, on the exterior of the spirally formed cooling tube.

9. The cooling unit substantially as described in claim 7, further characterized in that the means for maintaining the shape of the spirally wound structure, consists of a spirally wrapped strip element secured to successive convolutions of the unit, interiorly of the spirally formed cooling tube.

10. In a beverage serving cabinet or the like, in combination, a mechanical refrigeration system including an evaporator within the cabinet, a draft tap assembly including a draft tap, a draft tube leading to the tap from the cabinet, a vertical casing carried by the cabinet and spacedly surrounding a portion of the draft tube in the vicinity of the tap, a refrigerant coil in the casing, spirally wrapped about the portion of the draft tube therein, and having its ends extended from the lower end of the casing into a portion of the cabinet, and connected in series in the refrigerant circuit with and ahead of the evaporator, and a filling material in said vertical casing, serving relatively to position the cooling tube and draft tube with respect to the casing, and being of a permanently plastic nature and high thermal conductivity, said filling material consisting essentially of aluminum particles in a bitumastic matrix, and a sealing and supporting head of a plastic material occupying the lower end of the casing, serving as a support for the tube and the conductive plastic material in the casing.

LOUIS WEISS.